M. KRUCZYNSKI.
ELECTRIC RAT TRAP.
APPLICATION FILED MAY 19, 1911.
1,038,902.
Patented Sept. 17, 1912.
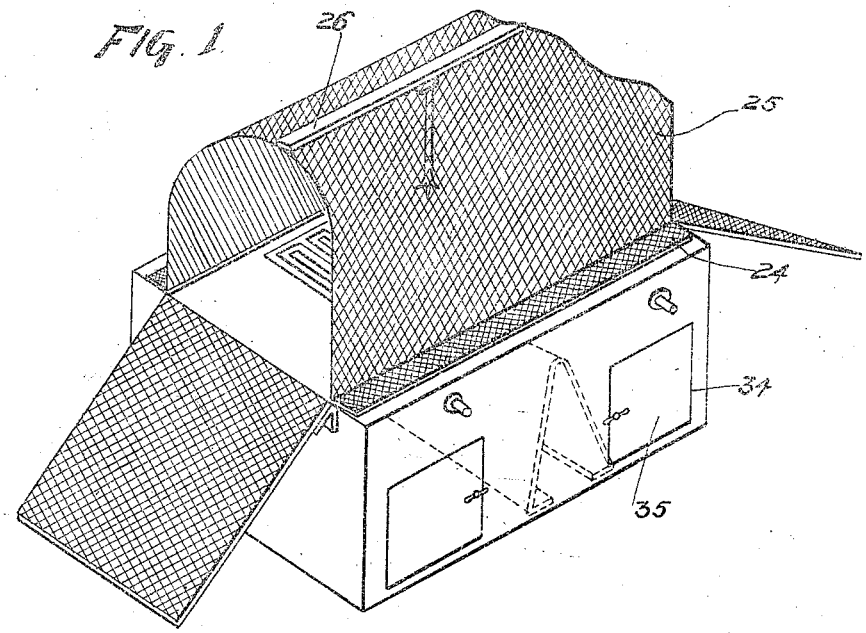
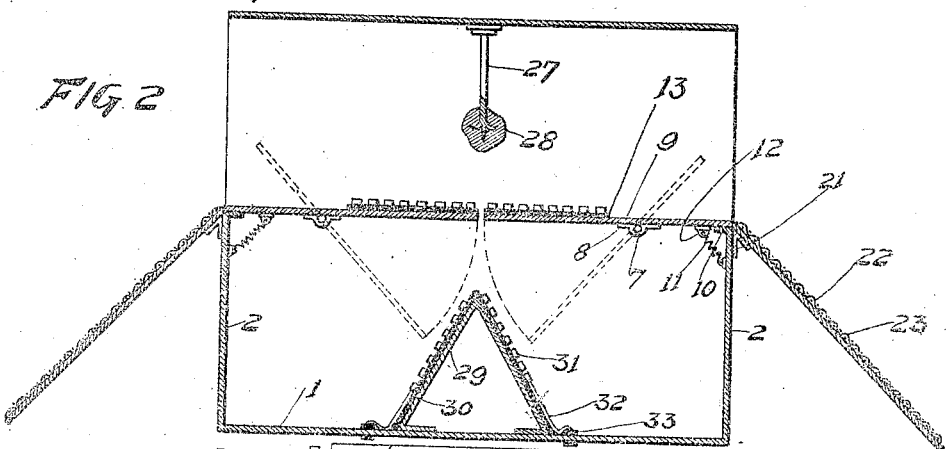
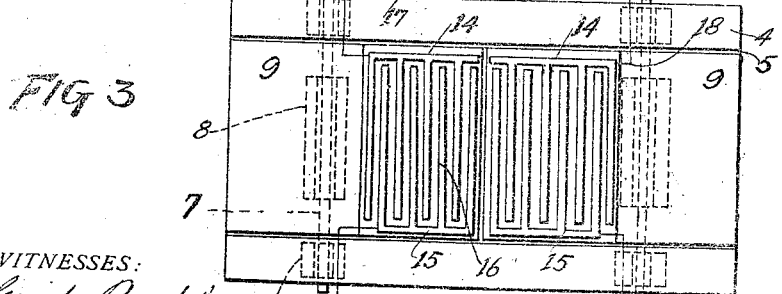
WITNESSES:
INVENTOR.
M. KRUCZYNSKI.
ATTORNEYS.

UNITED STATES PATENT OFFICE.

MIKE KRUCZYNSKI, OF ELYRIA, OHIO.

ELECTRIC RAT-TRAP.

1,038,902.

Specification of Letters Patent. Patented Sept. 17, 1912.

Application filed May 19, 1911. Serial No. 628,213.

*To all whom it may concern:*

Be it known that I, MIKE KRUCZYNSKI, a subject of the Emperor of Austria-Hungary, residing at Elyria, in the county of Lorain and State of Ohio, have invented certain new and useful Improvements in Electric Rat-Traps, of which the following is a specification, reference being had therein to the accompanying drawing.

This invention relates to an electric rat trap, and the purposes of my invention are to utilize an electric current for shocking and exterminating rats and other rodents, and to provide suitable trap doors for discharging the bodies of rats in a receptacle, where the bodies are confined invisible from other rats in the vicinity of the trap, and further subjected to a charge of electricity.

Further objects of my invention are to provide a trap of the above type that can be safely handled and used to an advantage in wharves, warehouses and other structures for exterminating rodents, and to accomplish the above results by a structure that is simple, durable and inexpensive to manufacture.

I attain the above objects by a mechanical construction that will be hereinafter specifically described and then claimed, and reference will now be had to the drawing, wherein:—

Figure 1 is a perspective view of a portion of a trap in accordance with this invention, Fig. 2 is a longitudinal sectional view of the same, and Fig. 3 is a plan of the trap with the housing thereof removed.

A trap in accordance with this invention comprises a rectangular receptacle having a base plate 1, end walls 2, side walls 3 and a top plate 4. The top plate 4 is provided with a longitudinal opening 5 corresponding in length to the trap and of a less width than said trap. The top plate 4 has the underneath side thereof provided with bearings 6 at the edges of the opening 5, and pivotally mounted in said bearings are transverse rods 7 extending through straps 8, carried by the trap doors 9. The trap doors 9 have the outer edges thereof resting upon ledges 10, carried by the upper edges of the walls 2, said trap doors being normally retained in a horizontal or closed position by retractile springs 11, said springs having the upper ends thereof connected to eyes 12, carried by the underneath sides of the trap doors 9, and the lower convolutions thereof connected to the inner sides of the end walls 2.

Mounted upon the inner ends of the trap doors 9 are plates 13 of insulation, as fiber and arranged upon the plates are contact bars 14 and 15 having extensions 16 alternately arranged in parallelism. The contact bars 14 are connected by wires 17 and 18 to the negative pole of a suitable source of electrical energy, and the contact bars 16 are connected by wires 19 and 20 to the positive pole of a suitable source of electrical energy, as a battery or ordinary light circuit of a building.

The end walls 2 at the upper edges thereof are provided with brackets 21 supporting the upper ends of gang planks 22, said gang planks being covered with interwoven wire 23, whereby a rat can easily obtain a purchase upon the gang planks to enter the trap.

Mounted upon the top plate 4 are the lateral flanges 24 of a semi-cylindrical housing 25, preferably made of interwoven wire, said housing having interwoven ends and the top thereof reinforced by a longitudinal metallic strip 26, which adds rigidity to the housing. The strip 26 intermediate the ends thereof and at a point centrally of the housing is provided with a depending bait holder 27 adapted to hold the bait 28 directly above the front edges of the trap doors 9.

Mounted upon the bottom plate 1 intermediate the ends thereof is a transverse inverted V-shaped shell 29 covered with insulation material 30, as fiber. Arranged upon the inclined walls of the insulation material 30 are contact bars 31 having extensions similar to the bars 14. The contact bars 31 are provided with wires 32 that extend through insulators 33 arranged in the bottom plate 1. The wires 32 being in circuit with the same source of electrical energy, as the wires 17 to 20 inclusive.

One of the side walls 3 is provided with doorways 34 normally closed by doors 35, said doorways permitting of easy access being had to the trap to remove electrocuted bodies therefrom.

When a rat or other rodent steps on to the extensions 16 of the contact bars 14 and 15 of the trap doors 9, an electrical circuit is immediately completed that shocks the rat, and the weight of the rat's body upon the trap doors causes said doors to open and deposit the rat in the receptacle of the trap. If the rat is not thoroughly electrocuted by contacting with the extensions 16 of the bars 14 and 15, the body of the rat will contact with the bars 31 and receive an additional charge of electricity that thoroughly exterminates the life of the rat. Immediately upon the trap doors being released by the weight of the rat's body, the trap doors are returned to their normal position through the medium of the retractile springs 11.

As will be seen, the contact bars on the inclined walls 29 are arranged spaced above the bottom of the receptacle. This construction provides for electrocuting the rodent, and at the same time tends to prevent a short circuiting, the contacts being above the normal position of the electrocuted rodents, but so arranged that, should the contacts on the tilting doors not provide the electrocution, the attempt of the rodent to pass over the contacts within the receptacle would insure this action.

What I claim is:—

In an electric rat trap, a receptacle, a pair of tilting doors opposing each other and each carrying contacts insulated from its door and each other and forming the terminals of an electrocuting circuit, means for normally retaining said doors in a substantially common plane, and a member carried by the bottom of the receptacle and being of inverted V-shape in cross section with the apex in a vertical plane passing between the doors, each of the inclined walls of said member carrying contacts insulated from the member and from each other to form terminals of electrocuting circuits, said contacts being spaced from the bottom of the receptacle.

In testimony whereof I affix my signature in the presence of two witnesses.

MIKE KRUCZYNSKI.

Witnesses:
PAULINE KALEY,
FLORENCE HAMEL.

---

Copies of this patent may be obtained for five cents each, by addressing the "Commissioner of Patents, Washington, D. C."